W. F. & J. BARNES.
FOOT-POWER.
No. 177,088. Patented May 9, 1876.
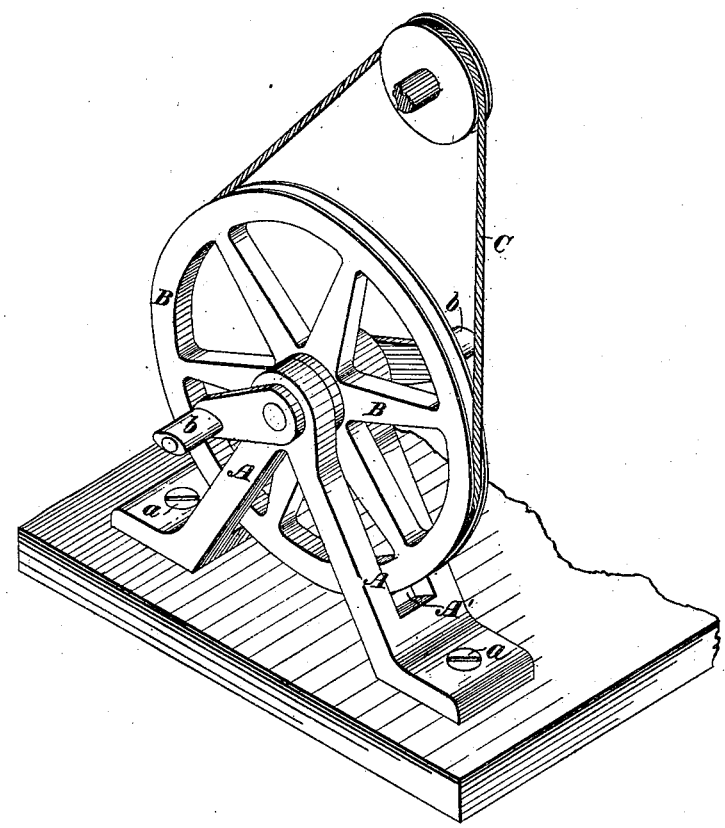
WITNESSES
Wm. A. Skinkle
Wm. J. Peyton.
By their Attorney
INVENTORS
William F. Barnes
John Barnes.
Wm. D. Baldwin

UNITED STATES PATENT OFFICE

WILLIAM F. BARNES AND JOHN BARNES, OF ROCKFORD, ILLINOIS.

IMPROVEMENT IN FOOT-POWERS.

Specification forming part of Letters Patent No. 177,088, dated May 9, 1876; application filed April 17, 1876.

*To all whom it may concern:*

Be it known that we, WILLIAM FLETCHER BARNES and JOHN BARNES, both of Rockford, in the county of Winnebago and State of Illinois, have invented certain new and useful Improvements in Foot-Powers, of which the following is a specification:

Our present invention constitutes an improvement on the foot-power shown and described in Letters Patent of the United States granted to us March 21, 1876, as No. 175,010.

In that patent we have shown a machine driven by a double-cranked driving-pulley operated directly by the feet of the operator, the pulley being mounted upon the frame of the machine itself, in which case the frame had to be constructed especially for the reception of the pulley and its supporting-shaft.

To enable us to use our improved double-cranked pulley without supporting it directly upon the frame of the machine, and to use it in connection with scroll-saws, lathes, and other light machinery now in use, without altering or adapting their frame for its support, is the prime object of our present invention. To this end we employ a light, compact, and movable frame, in which is mounted the double-cranked driving-pulley, said frame being properly secured, when in use, near the base of the machine to be operated, belt-connections passing from the driving-pulley to a small pulley or shaft of the machine, as fully described in our aforesaid patent.

The accompanying drawing represents a perspective view of our double-cranked driving-pulley and its movable frame. A light, compact, and movable frame, A, preferably of metal, shown in the present instance as of an inverted V form, is provided with perforations *a a*, through which screws may be passed to secure it permanently to the floor or other base, if desired. This frame is provided with a central passage or recess, A', for the reception of a double-cranked driving-pulley, B, the shaft or axis of which turns in suitable bearings in the frame, and carries on its ends the driving-cranks, which are provided with loose bearing-sleeves *b b* for an obvious purpose, to which the feet of the operator are directly applied when the pulley is to be operated. The pulley is grooved for the reception of the driving-belt connections C, which pass therefrom over a small pulley or shaft of the machine to be driven, as fully described in our aforesaid patent.

The form of frame shown in the drawing is preferred to any we have yet tried, on account of cheapness in manufacture; but its particular construction constitutes no part of the subject-matter herein claimed.

The advantages and operation of our device are obvious.

We do not wish to be understood as claiming a double-cranked wheel, such as commonly used for propelling velocipedes, nor do we claim a double-cranked pulley for driving machinery when used in connection with foot-boards or pedals, as that is very old.

We claim as of our own invention—

The foot-power hereinbefore described, consisting of the combination of a movable frame separate from that of the machine to be driven, a double-cranked driving-pulley mounted therein, to the cranks of which the feet of the operator are directly applied; and belt-connections passing from the pulley to the driven machine.

In testimony whereof we have hereunto subscribed our names.

WILLIAM F. BARNES.
    JOHN BARNES.

Witnesses:
 OMER HARBISON,
 ALLEN R. REX.